March 29, 1927.
J. K. RICHIE
POSTAL SCALE
Filed Dec. 6, 1923
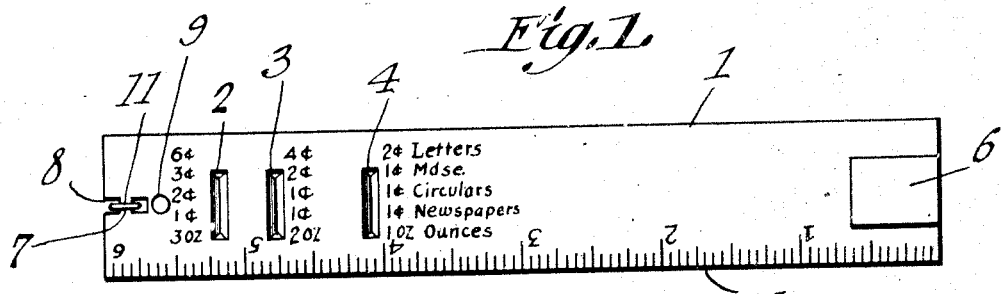
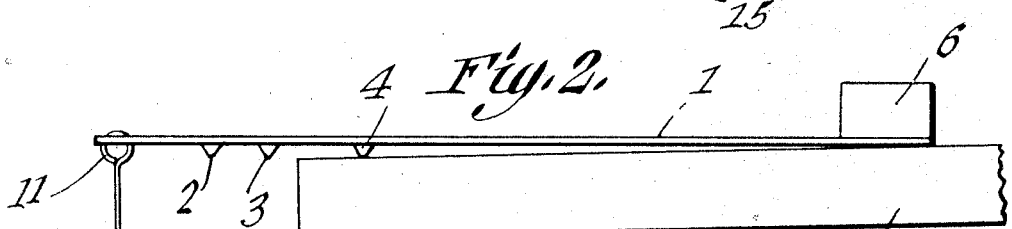
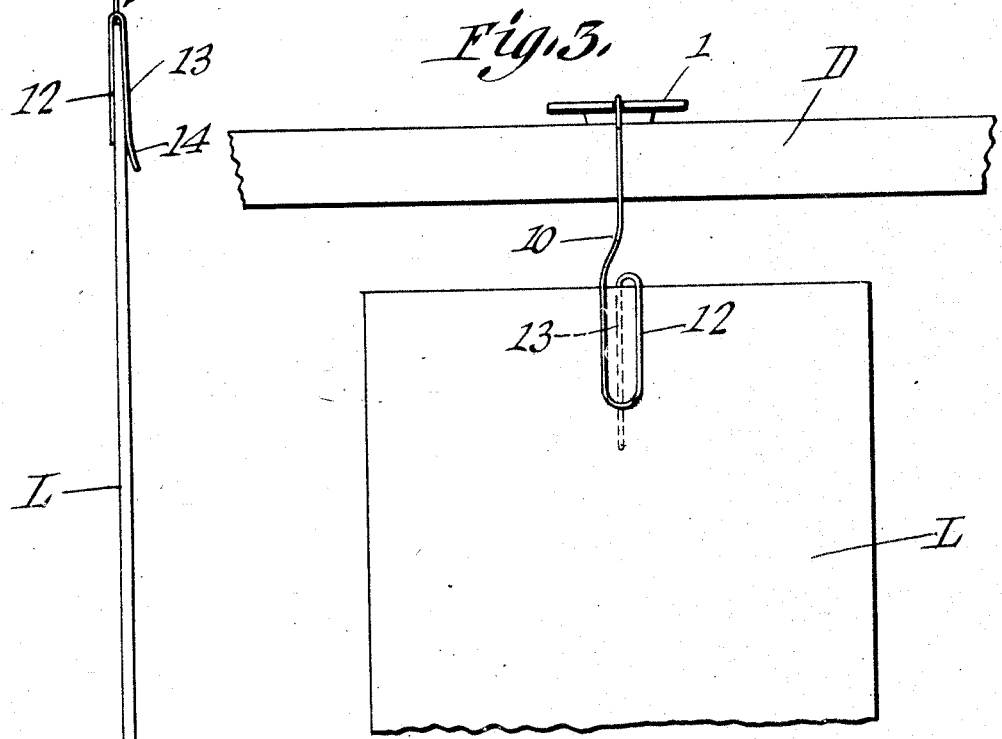
Inventor
J. K. Richie
By C. A. Snow & Co.
Attorneys Patented Mar. 29, 1927.

1,622,924

UNITED STATES PATENT OFFICE.

JAMES KING RICHIE, OF BUTLER, PENNSYLVANIA.

POSTAL SCALE.

Application filed December 6, 1923. Serial No. 678,953.

This invention relates to scales and more particularly to postal scales.

The object of the invention is to provide a simple and efficient device of this character in which a single beam is used equipped with one or more fulcrums or balancing points carried by the beam and adapted for use on any supporting surface, the beam being shiftable from one point to the other according to the weight of the article.

Another object is to provide a device of this character equipped with article supporting means constructed so that the article suspended therefrom will always swing with its flat face to the side of the support on which the scale beam is mounted.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a top plan view of the scale constituting this invention.

Fig. 2 is a side elevation thereof shown applied.

Fig. 3 is an end view showing a letter supported thereby; and

Fig. 4 is a detail longitudinal section showing a slightly different form of balancing point.

In the embodiment illustrated a scale beam 1 is shown constructed of sheet metal, steel, hardrubber, celluloid or any suitable material. This beam may be of any desired length and may be equipped at one end with a weight 6 when it is found desirable to use such.

The beam 1 is provided at the end opposite to that carrying the weight 6 with one or more balancing points spaced longitudinally apart at varying distances, three being here shown and numbered 2, 3 and 4. These points may be of any desired cross sectional contour being preferably V-shaped as shown in Figs. 1 and 2 although they may be U-shaped as shown at 5 in Fig. 4.

These balancing points extend transversely of the beam on its lower face and are designed for use in weighing articles up to three ounces although obviously it may be equipped with more points for weighing heavier articles.

As is well known in postage the rate is so much per ounce or fraction thereof so that any weight less than an ounce requires the same postage as for an ounce while any weight greater than one ounce and less than two requires the same postage as for two ounces and so on for each ounce or fraction thereof.

A spring clasp 10 is carried by the end of the beam 1 on which the balancing points are mounted it being here shown suspended by an eye 11 from a cross bar 7 formed in a notch 8 of the beam end. This clasp is constructed of a piece of spring wire bent to form a loop 12 having a cooperating gripping finger 13 arranged longitudinally thereof between the side members of the loop and adapted to cooperate therewith to clamp a letter L or other article to be weighed. The finger 13 has its outer end flared as shown at 14 to facilitate the insertion of a letter or other article in the clasp. The eye 11 from which the clasp is suspended is positioned in a plane at right angles to loop 12 so that a letter carried by the clasp will always swing flat face with reference to the side of the table or desk shown at D.

In the use of this scale the letter or other parcel to be weighed is slipped into the jaws of the spring clasp 10 and the scale beam 1 placed on the top of a table or any flat surface so that the parcel will hang over the edge and the scale beam rest on the balancing point 4 in which position the point 3 will clear the edge of the table as shown in Fig. 2. In this position if the article suspended in the clasp 10 weighs less than one ounce the inner or rear end of the scale beam will not tip up from the table top D. If the article weighs more than one ounce this end of the scale beam will rise. It will thus be seen that an article suspended by clasp 10 which does not tip the inner end of beam 1 when the scale is resting on the balancing point 4 will require postage for one ounce, the amount of the postage for letters, merchandise, circulars, and newspapers being printed on the upper face of the beam adjacent the balancing points as is shown in Fig. 1.

If the parcel tips the scale when resting on the balancing point 4 then the beam is shifted rearwardly until it rests on balancing point 3 and when in this position the balancing point 2 will clear the table edge. In this position it requires more than two ounces to tip the scale and any weight less than two ounces will not tip it. It will thus be seen that any letter or parcel which tipped the scale when it was in first position or on balancing point 4 and does not tip it when in second position or on balancing point 3 will require postage for two ounces.

If the parcel tips the scale when resting on point 3 then the beam must be moved rearwardly until it rests on point 2 and this position will indicate whether the parcel weighs less than or more than three ounces.

While three balancing points only are shown obviously any desired number may be employed. The weight 6 is designed only for use when large size articles are to be weighed and may be dispensed with by making the beam longer.

The beam 1 is shown provided with an aperture 9 to be used in hanging up the scale when not in use and the beam is preferably provided with rule graduations as shown at 15.

From the above description it will be obvious that this scale may be very cheaply constructed especially adapting it for advertising purposes and the gist of the invention resides in providing a scale beam with one or more balancing points the beam being shiftable to balance it on the proper point according to the weight of the article to be weighed.

I claim:

A weighing scale including a beam, having transversely disposed depressions formed in the upper surface thereof, said depressions defining knife-like projections on the opposite side of the beam providing pivot points, said knife-like projections being spaced various distances apart and arranged adjacent to one end of the beam, one end of the beam having a notch formed therein and having a cut out portion disposed adjacent to the notch defining a bar, a clasp adapted to be pivotally hung on the bar, and a weight at the opposite end of the beam.

In testimony that I claim the foregoing as my own, I have hereto affixed my signature.

JAMES KING RICHIE.